(12) United States Patent
Garff

(10) Patent No.: US 11,082,609 B2
(45) Date of Patent: Aug. 3, 2021

(54) USER DEVICE FOR FACILITATING THE CONTROLLED OPERATION OF A CAMERA

(71) Applicant: Joseph Garff, Palm Harbor, FL (US)

(72) Inventor: Joseph Garff, Palm Harbor, FL (US)

( * ) Notice: Subject to any disclaimer, the term of this patent is extended or adjusted under 35 U.S.C. 154(b) by 9 days.

(21) Appl. No.: 16/836,202

(22) Filed: Mar. 31, 2020

(65) Prior Publication Data

US 2020/0396374 A1 Dec. 17, 2020

Related U.S. Application Data

(60) Provisional application No. 62/860,087, filed on Jun. 11, 2019.

(51) Int. Cl.
*H04N 5/232* (2006.01)

(52) U.S. Cl.
CPC ..... *H04N 5/23216* (2013.01); *H04N 5/23222* (2013.01); *H04N 5/23293* (2013.01)

(58) Field of Classification Search
CPC ........... H04N 5/23216; H04N 5/23222; H04N 5/232411; H04N 5/23293
USPC .................................................. 348/333.01
See application file for complete search history.

(56) References Cited

U.S. PATENT DOCUMENTS

| 5,900,909 | A | 5/1999 | Parulski et al. |
| 10,297,076 | B2 * | 5/2019 | Yu ........................ G06K 9/4604 |
| 10,623,648 | B2 * | 4/2020 | Kondo ............... H04N 5/23245 |
| 10,893,216 | B2 * | 1/2021 | Oyama ................ H04N 5/2252 |
| 2004/0017506 | A1 | 1/2004 | Livingston |
| 2014/0184867 | A1 * | 7/2014 | Sudo ..................... G06F 1/1694 348/333.01 |
| 2015/0022704 | A1 | 1/2015 | Fratti et al. |
| 2017/0213385 | A1 * | 7/2017 | Yu ........................... G06T 17/20 |
| 2018/0139485 | A1 * | 5/2018 | Ansari ............... H04N 21/2743 |
| 2018/0234630 | A1 * | 8/2018 | Kondo ............... H04N 5/23245 |
| 2019/0208142 | A1 * | 7/2019 | Kitaya ................. H04N 5/2628 |
| 2019/0285306 | A1 * | 9/2019 | Kitazaki ................... F24F 11/58 |

FOREIGN PATENT DOCUMENTS

EP 1608153 B1 8/2008

OTHER PUBLICATIONS

"Use Hand Gestures to Take Pictures on Android [How-To]", https://www.youtube.com/watch?v=jkZWU2iJNMM.

* cited by examiner

*Primary Examiner* — Pritham D Prabhakher

(57) ABSTRACT

Disclosed herein is a user device for facilitating the controlled operation of a camera. Further, the user device may include at least one sensor, at least one camera, a processing device, a presentation device, and an input device. Further, the at least one sensor may be configured for generating at least one sensor data associated with the user device. Further, the at least one camera may be configured to generate at least one image. Further, the processing device may be communicatively coupled with the at least one sensor and the at least one camera. Further, the presentation device communicatively coupled with the processing device. Further, the input device communicatively coupled with the processing device. Further, the input device may be configured for receiving at least one input data from a user associated with the user device.

20 Claims, 12 Drawing Sheets

USER DEVICE FOR FACILITATING THE CONTROLLED OPERATION OF A CAMERA

The current application claims a priority to the U.S. Provisional Patent application Ser. No. 62/860,087 filed on Jun. 11, 2019.

FIELD OF THE INVENTION

Generally, the present disclosure relates to the field of electronic devices. More specifically, the present disclosure relates a user device for facilitating the controlled operation of a camera.

BACKGROUND OF THE INVENTION

Taking pictures is an easy way to create a permanent reminder of a fleeting experience. For years' photographs were the only way to capture a moment. However, once video became available it soon became a booming industry. Initially, video recordings could be performed by mostly wealthy experimenters and producers. However, as time went on the technology became more ubiquitous and the use of video recorders became more widespread. Video recording has become such a commonplace practice that everyday appliances from phones to doorbells are equipped with cameras.

Now that videography is such a commonplace occurrence, it has become clear that the timing and skill required to record a moment in a captivating manner are not easily acquired. Because of this, a user often ends up with video clips which completely miss the action he is trying to record. Frequently, the moments are so compelling that the user forgets to hit a button to start the recording. Another problem with currently available videography techniques is that a user must manually stop recording. This requirement frequently results in long videos containing nothing in particular. In many situations the user thinks a scene is being recorded when in fact it is not. This is due to the fact that the record indicator is so subtle that it is hard to determine if the camera is recording. Another situation is when the user is recording an event, and he needs to easily discard the just recorded video before recording the next one. Existing apps and devices require many steps to accomplish this task, thus decreasing the ability to quickly start recording a new movie clip, and often preventing users from recording worthwhile events.

Therefore, there is a need for an improved user device for facilitating the controlled operation of a camera that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a user device, in accordance with some embodiments. Accordingly, the user device may include at least one sensor, at least one camera, a processing device, a presentation device, and an input device. Further, the at least one sensor may be configured for generating at least one sensor data associated with the user device. Further, the at least one sensor data corresponds to at least one physical state of the user device. Further, the at least one camera may be configured to generate at least one image. Further, the processing device may be communicatively coupled with the at least one sensor and the at least one camera. Further, the processing device may be configured for analyzing the at least one sensor data. Further, the processing device may be configured for determining a mode based on the analyzing. Further, the mode may include at least one of a recording mode and a standby mode. Further, the processing device may be configured for activating the at least one camera based the mode. Further, the processing device may be configured for presenting a plurality of options based on the mode being the standby mode. Further, the processing device may be configured for processing the at least one image based on an option of the plurality of options. Further, the presentation device communicatively coupled with the processing device. Further, the presentation device may be configured for presenting the plurality of options. Further, the input device communicatively coupled with the processing device. Further, the input device may be configured for receiving at least one input data from a user associated with the user device. Further, the at least one input data corresponds to the option of the plurality of options.

Disclosed herein is a user device, in accordance with some embodiments. Accordingly, the user device may include at least one sensor, at least one camera, a microphone, a processing device, a presentation device, and an input device. Further, the at least one sensor may be configured for generating at least one sensor data associated with the user device. Further, the at least one sensor data corresponds to at least one physical state of the user device. Further, the at least one camera may be configured to generate at least one image. Further, the microphone may be configured to generate at least one sound data. Further, the processing device may be communicatively coupled with the at least one sensor, the microphone and the at least one camera. Further, the processing device may be configured for analyzing the at least one sensor data. Further, the processing device may be configured for determining a mode based on the analyzing. Further, the mode may include at least one of a recording mode and a standby mode. Further, the processing device may be configured for activating the at least one camera and the microphone based the mode. Further, the processing device may be configured for presenting a plurality of options based on the mode being the standby mode. Further, the processing device may be configured for processing the at least one image based on an option of the plurality of options. Further, the presentation device may be communicatively coupled with the processing device. Further, the presentation device may be configured for presenting the plurality of options. Further, the input device may be communicatively coupled with the processing device. Further, the input device may be configured for receiving at least one input data from a user associated with the user device. Further, the at least one input data corresponds to the option of the plurality of options.

Disclosed herein is a user device, in accordance with some embodiments. Accordingly, the user device may include at least one sensor, at least one camera, a microphone, a processing device, a presentation device, and an input device. Further, the at least one sensor may be configured for generating at least one sensor data associated with the user device. Further, the at least one sensor data corresponds to at least one of an orientation and a motion of the user device. Further, the at least one camera may be configured to generate at least one image. Further, the microphone may be configured to generate at least one sound data. Further, the processing device may be communicatively coupled with the at least one sensor, the microphone and the at least one camera. Further, the processing device may be configured for analyzing the at least one sensor data. Further, the processing device may be configured for determining a mode based on the analyzing. Further, the mode may include at least one of a recording mode and a standby mode. Further, the processing device may be configured for activating the at least one camera and the microphone based the mode. Further, the processing device may be configured for presenting a plurality of options based on the mode being the standby mode. Further, the processing device may be configured for processing the at least one image based on an option of the plurality of options. Further, the presentation device communicatively coupled with the processing device. Further, the presentation device may be configured for presenting the plurality of options. Further, the input device communicatively coupled with the processing device. Further, the input device may be configured for receiving at least one input data from a user associated with the user device. Further, the at least one input data corresponds to the option of the plurality of options.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
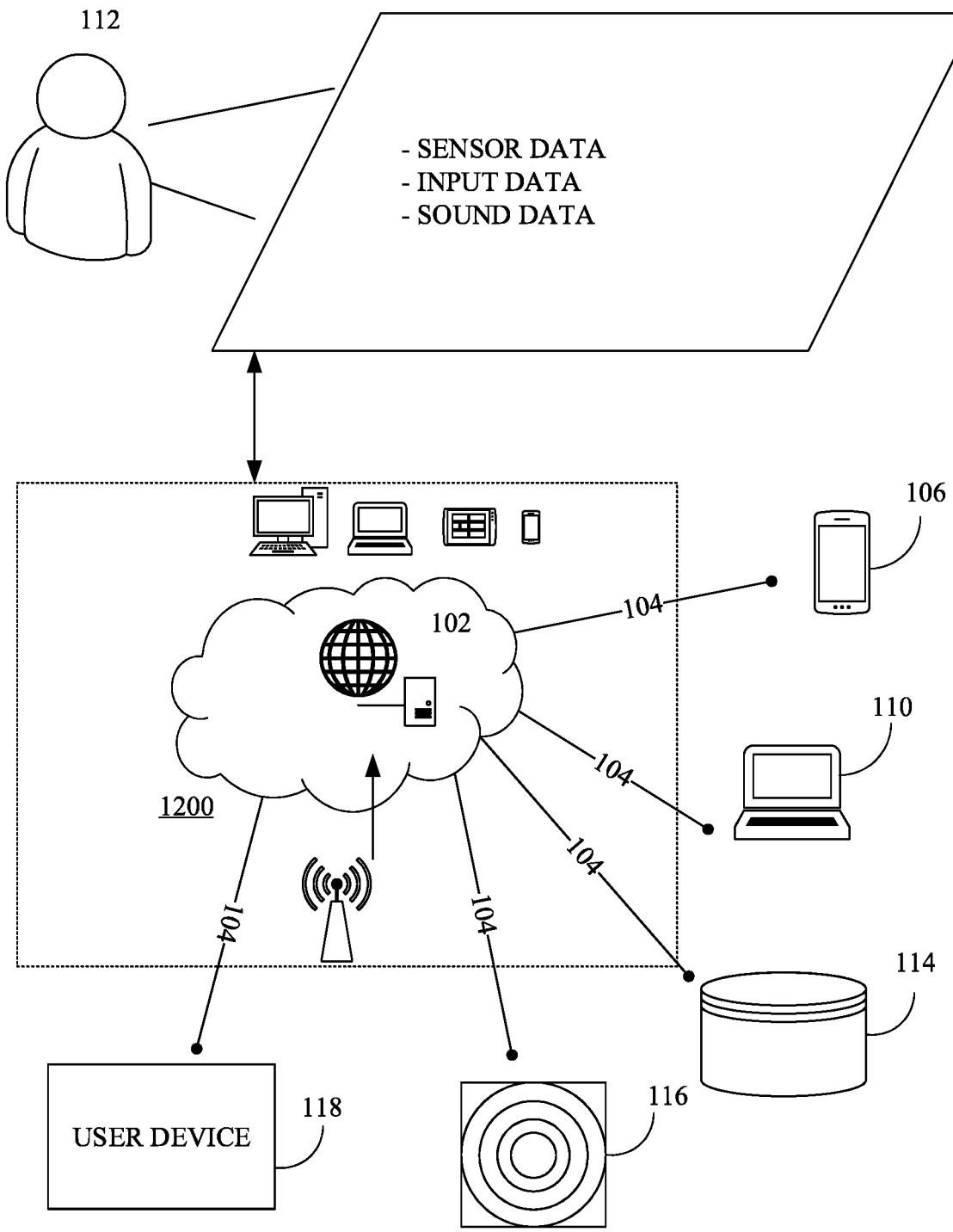
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of a user device for facilitating the controlled operation of a camera, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes a user device for facilitating the controlled operation of a camera. Further, the present disclosure relates generally to a system for recording videos, more particularly to a program which uses device orientation and user gestures to control the operation of a video camera. Further, a user of the present disclosure may be able to start, stop, save, edit, merge and delete video recordings by changing the position or orientation of a smart device running a Smart Takes system.

Further, the present disclosure "Smart Takes", addresses these concerns by providing a system for automatically starting and stopping video recordings. Further, the Smart Takes may be associated with a user device. Further, the Smart Takes system enables a user to always be ready to record an event by relying on device orientation and gesture control. Where traditional video cameras rely on the push of a button, the Smart Takes system begins recording as soon as the user moves his camera in front of his face. In this way the Smart Takes system provides an intuitive interface for video recording. To stop recording the user simply lowers his camera or smart device.

Further, in some embodiment of the present disclosure, the Smart Takes, is a system for using gesture controls and device orientation to operate a camera. It is an aim of the present disclosure to provide a program which may be directed to start, stop, merge, edit, save and delete video recordings by using gestures or changing the orientation of a smart device or camera. The term 'engine' may be used herein to describe collections of programs which are grouped by function. Additionally, the term 'smart device' is used to describe mobile electronic devices which are capable of running the Smart Takes software and have a screen, camera, accelerometer, and gyroscope.

In its preferred method of use, the Smart Takes is a program that ensures a user may able to record memorable moments from start to finish. Further, this functionality may be enabled by using the data generated by the accelerometers or gyroscopes of a smart device to monitor the orientation of a smart device. Further, the Smart Takes system recognizes when a user intends to record a video by analyzing this data. That is, the Smart Takes system enters standby mode when the smart device is horizontal to the surface of the earth. In this mood, the device provides the user with options to "delete the video clip", "save the video clip" or "save the video clip and add the video clip to the previously taken video clip". Further, the transition of the Smart Takes system into recording mode when the smart device is placed into an orientation perpendicular to the surface of the earth. It is an aim of the present disclosure to provide a system that automatically starts recording when the smart device is moved into a perpendicular orientation. In this way, a phone running the Smart Takes system is always ready to record the memorable moments occurring around a user.

Referring now to figures, FIG. 1 is an illustration of an online platform 100 consistent with various embodiments of the present disclosure. By way of non-limiting example, the online platform 100 to facilitate the controlled operation of a camera may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114, sensors 116, and a user device 118 over a communication network 104, such as, but not limited to, the Internet. Further, users of the online platform 100 may include relevant parties such as, but not limited to, end-users, administrators, service providers, service consumers and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 1200.

Figure 2:
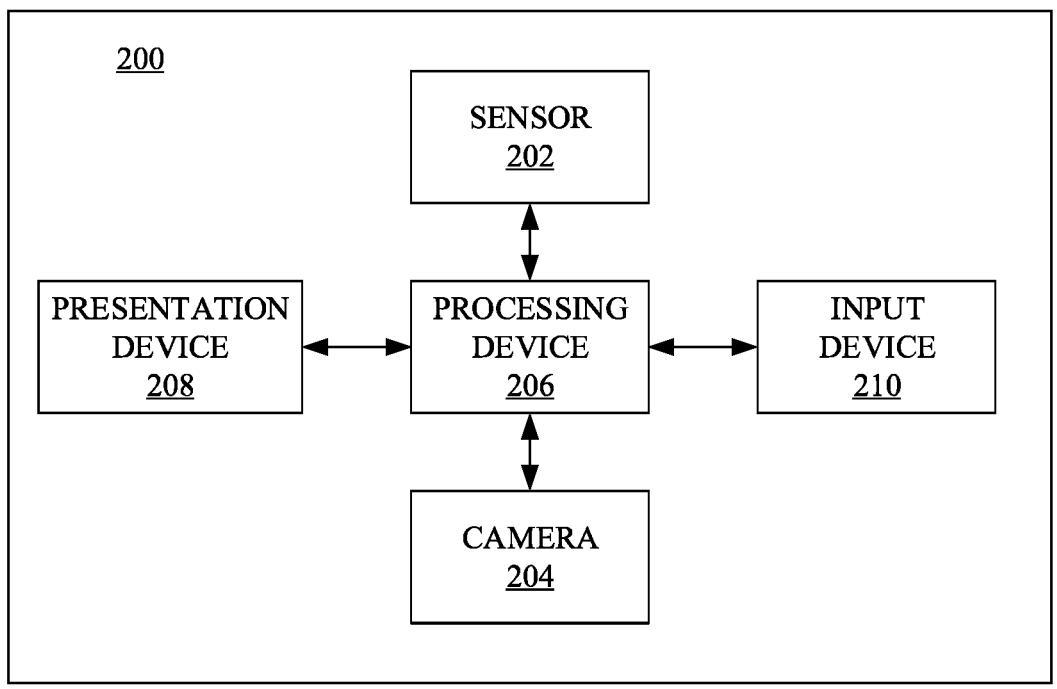
FIG. 2 is a block diagram of a user device, in accordance with some embodiments.

FIG. 2 is a block diagram of a user device 200, in accordance with some embodiments. Accordingly, the user device 200 may include at least one sensor 202, at least one camera 204, a processing device 206, a presentation device 208, and an input device 210.

Figure 5:
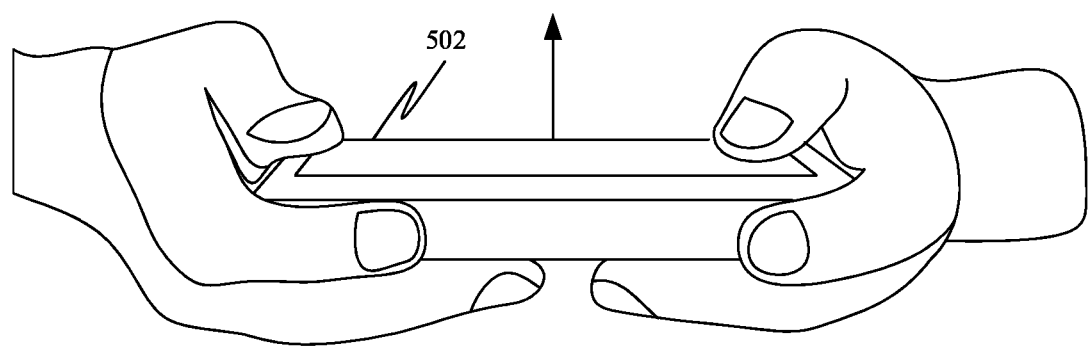
FIG. 5 is a perspective view of a user holding a user device in horizontal state, in accordance with some embodiments.
Figure 6:
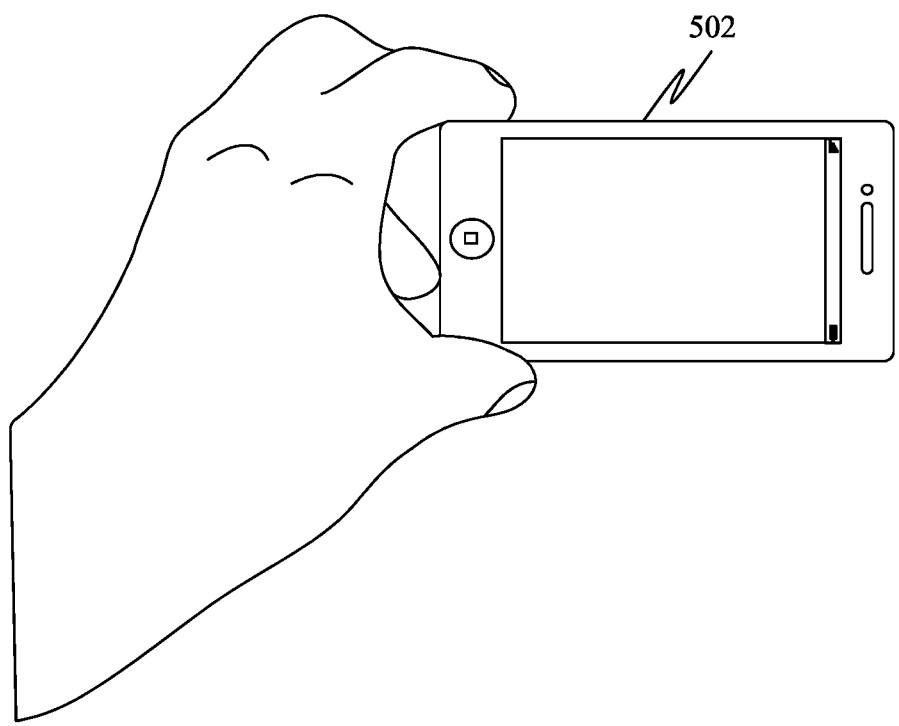
FIG. 6 is a perspective view of a user holding a user device in vertical state, in accordance with some embodiments.

Further, the at least one sensor 202 may be configured for generating at least one sensor data associated with the user device 200. Further, the at least one sensor data corresponds to at least one physical state of the user device 200. Further, the at least one physical state may include a horizontal state and a vertical state. Further, the horizontal state may include the user device 200 positioned parallel to the ground, as shown in FIG. 5. Further, the vertical state may include the user device 200 positioned vertical to the ground, as shown in FIG. 6.

Further, the at least one camera 204 may be configured to generate at least one image.

Further, the processing device 206 may be communicatively coupled with the at least one sensor 202 and the at least one camera 204. Further, the processing device 206 may be configured for analyzing the at least one sensor data. Further, the processing device 206 may be configured for determining a mode based on the analyzing. Further, the mode may include at least one of a recording mode and a standby mode. Further, the processing device 206 may be configured for activating the at least one camera 204 based on the mode. Further, the processing device 206 may be configured for presenting a plurality of options based on the mode being the standby mode. Further, the plurality of options may include a record option, a save option, a delete option, an edit option, etc. Further, the processing device 206 may be configured for processing the at least one image based on an option of the plurality of options.

Further, the presentation device 208 communicatively coupled with the processing device 206. Further, the presentation device 208 may be configured for presenting the plurality of options.

Further, the input device 210 communicatively coupled with the processing device 206. Further, the input device 210 may be configured for receiving at least one input data from a user associated with the user device 200. Further, the at least one input data corresponds to the option of the plurality of options.

Further, in some embodiments, the user device 200 further may include a microphone communicatively coupled with the processing device 206. Further, the microphone may be configured for generating at least one sound data. Further, the processing device 206 may be configured for activating the microphone based on the mode.

Further, in some embodiments, the input device 210 may be configured to generate the at least one input data based on at least one signal provided by the user. Further, the at least one signal corresponds to the option.

Further, in some embodiments, the input device 210 may be configured to generate the at least one input data based on the physical state of the user device 200. Further, the at least one physical state of the user device 200 corresponds to the option.

Further, in some embodiments, the at least one sensor data corresponds to at least one signal provided by the user. Further, the determining of the mode may be based on the analyzing of the at least one sensor data.

Further, in some embodiments, the presentation device 208 may be configured for presenting the at least one image.

Further, in some embodiments, the at least one sensor data corresponds to an environment of the user device 200. Further, the determining of the mode may be based on the analyzing of the at least one sensor data.

Further, in some embodiments, the presentation device 208 may be configured for receiving an option indication from the user associated with the user device 200. Further, the option indication corresponds to the option.

Further, in some embodiments, the processing device 206 may be further configured for presenting a plurality of recording options based on the mode being the recording mode. Further, the plurality of recording options may include a filter option, a resolution adjustment option, etc. Further, the filter option may include a beauty mode option, an effect option, etc. Further, the processing device 206 may be further configured for processing the at least one image based on a recording option of the plurality of recording options. Further, the presentation device 208 may be configured for presenting the plurality of recording options. Further, the input device 210 may be configured to receive the at least one input data corresponding to the recording option of the plurality of recording options.

Figure 3:
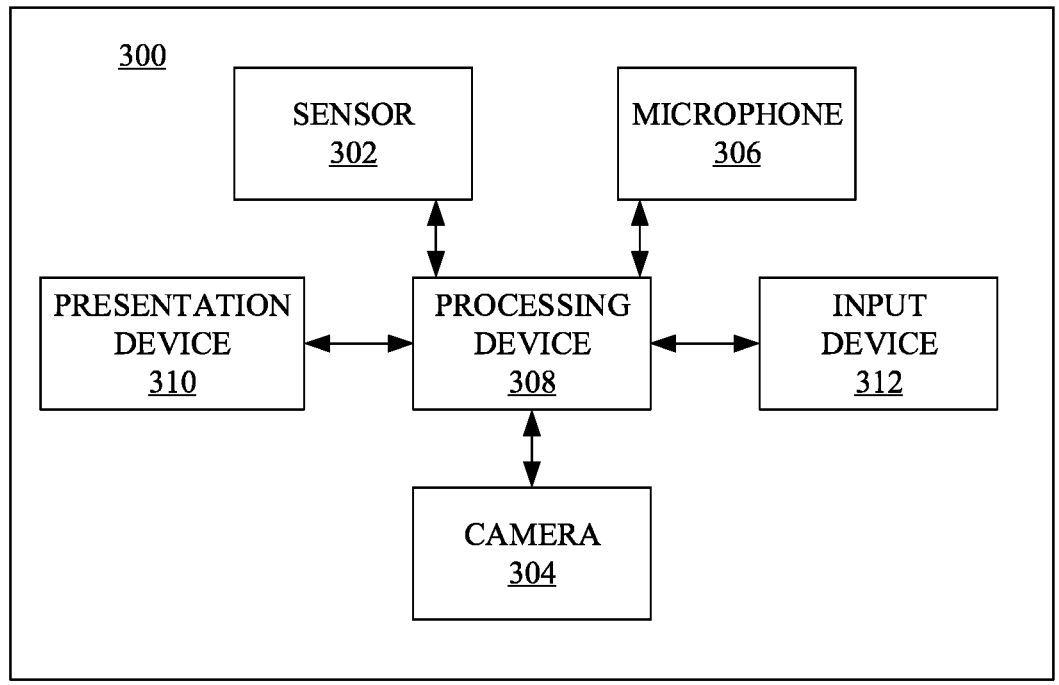
FIG. 3 is a block diagram of a user device, in accordance with some embodiments.

FIG. 3 is a block diagram of a user device 300, in accordance with some embodiments. Accordingly, the user device 300 may include at least one sensor 302, at least one camera 304, a microphone 306, a processing device 308, a presentation device 310, and an input device 312.

Further, the at least one sensor 302 may be configured for generating at least one sensor data associated with the user device 300. Further, the at least one sensor data corresponds to at least one physical state of the user device 300. Further, the at least one physical state may include a horizontal state and a vertical state. Further, the horizontal state may include the user device 300 positioned parallel to the ground, as shown in FIG. 5. Further, the vertical state may include the user device 300 positioned vertical to the ground, as shown in FIG. 6.

Further, the at least one camera 304 may be configured to generate at least one image.

Further, the microphone 306 may be configured to generate at least one sound data.

Further, the processing device 308 may be communicatively coupled with the at least one sensor 302, the microphone 306 and the at least one camera 304. Further, the processing device 308 may be configured for analyzing the at least one sensor data. Further, the processing device 308 may be configured for determining a mode based on the analyzing. Further, the mode may include at least one of a recording mode and a standby mode. Further, the processing device 308 may be configured for activating the at least one camera 304 and the microphone 306 based the mode. Further, the processing device 308 may be configured for presenting a plurality of options based on the mode being the standby mode. Further, the plurality of options may include a record option, a save option, a delete option, an edit option, etc. Further, the processing device 308 may be configured for processing the at least one image based on an option of the plurality of options.

Further, the presentation device 310 may be communicatively coupled with the processing device 308. Further, the presentation device 310 may be configured for presenting the plurality of options.

Further, the input device 312 may be communicatively coupled with the processing device 308. Further, the input device 312 may be configured for receiving at least one input data from a user associated with the user device 300. Further, the at least one input data corresponds to the option of the plurality of options.

Further, in some embodiments, the input device 312 may be configured to generate the at least one input data based on at least one signal provided by the user. Further, the at least one signal corresponds to the option.

Further, in some embodiments, the input device 312 may be configured to generate the at least one input data based on the physical state of the user device 300. Further, the at least one physical state of the user device 300 corresponds to the option.

Further, in some embodiments, the at least one sensor data corresponds to at least one signal provided by the user. Further, the determining of the mode may be based on the analyzing of the at least one sensor data.

Further, in some embodiments, the presentation device 310 may be configured for presenting the at least one image.

Further, in some embodiments, the at least one sensor data corresponds to an environment of the user device 300. Further, the determining of the mode may be based on the analyzing of the at least one sensor data.

Further, in some embodiments, the processing device 308 may be further configured for presenting a plurality of recording options based on the mode being the recording mode. Further, the plurality of recording options may include a filter option, a resolution adjustment option, etc. Further, the filter option may include a beauty mode option, an effect option, etc. Further, the processing device 308 may be configured for processing the at least one image based on a recording option of the plurality of recording options. Further, the presenting device may be configured for presenting the plurality of recording options. Further, the input device 312 may be configured to receive the at least one input data corresponding to the recording option of the plurality of recording options.

Further, in some embodiments, the presentation device 310 may be configured for receiving an option indication from the user associated with the user device 300. Further, the option indication corresponds to the option.

Figure 4:
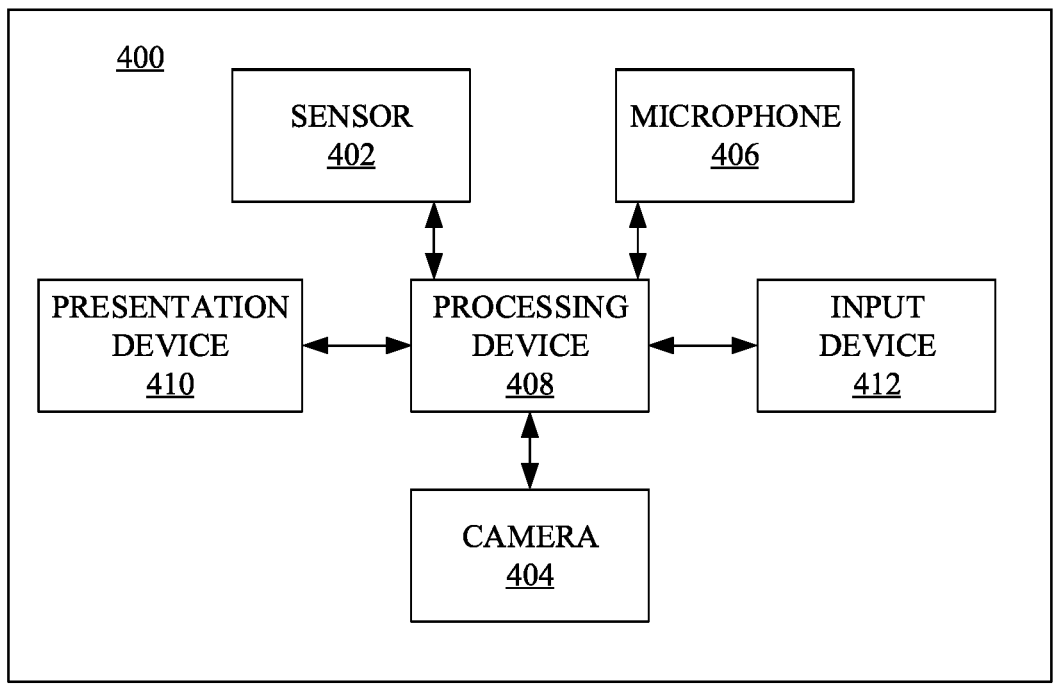
FIG. 4 is a block diagram of a user device, in accordance with some embodiments.

FIG. 4 is a block diagram of a user device 400, in accordance with some embodiments. Accordingly, the user device 400 may include at least one sensor 402, at least one camera 404, a microphone 406, a processing device 408, a presentation device 410, and an input device 412.

Further, the at least one sensor 402 may be configured for generating at least one sensor data associated with the user device 400. Further, the at least one sensor data corresponds to at least one of an orientation and a motion of the user device 400.

Further, the at least one camera 404 may be configured to generate at least one image.

Further, the microphone 406 may be configured to generate at least one sound data.

Further, the processing device 408 may be communicatively coupled with the at least one sensor 402, the microphone 406 and the at least one camera 404. Further, the processing device 408 may be configured for analyzing the at least one sensor data. Further, the processing device 408 may be configured for determining a mode based on the analyzing. Further, the mode may include at least one of a recording mode and a standby mode. Further, the processing device 408 may be configured for activating the at least one camera 404 and the microphone 406 based the mode. Further, the processing device 408 may be configured for presenting a plurality of options based on the mode being the standby mode. Further, the plurality of options may include a record option, a save option, a delete option, an edit option, etc. Further, the processing device 408 may be configured for processing the at least one image based on an option of the plurality of options.

Further, the presentation device 410 communicatively coupled with the processing device 408. Further, the presentation device 410 may be configured for presenting the plurality of options.

Further, the input device 412 communicatively coupled with the processing device 408. Further, the input device 412 may be configured for receiving at least one input data from a user associated with the user device 400. Further, the at least one input data corresponds to the option of the plurality of options.

Further, in some embodiments, the input device 412 may be configured to generate the at least one input data based on the at least one of the orientation and the motion of the user device 400. Further, the at least one of the orientation and the motion of the user device 400 corresponds to the option.

Further, in some embodiments, the input device 412 may be configured to generate the at least one input data based on at least one signal provided by the user. Further, the at least one signal corresponds to the option.

FIG. 5 is a perspective view of a user holding a user device 502 in horizontal state, in accordance with some embodiments.

FIG. 6 is a perspective view of a user holding a user device 502 in vertical state, in accordance with some embodiments.

Figure 7:
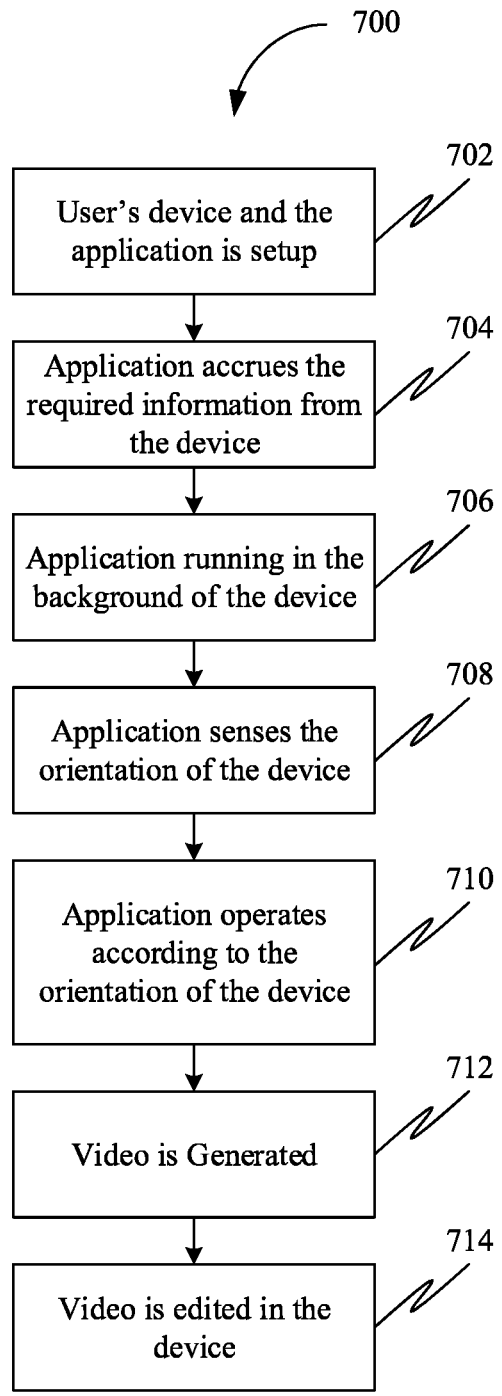
FIG. 7 is a flowchart of a method for facilitating a video editing using a user device, in accordance with some embodiments.

FIG. 7 is a flowchart of a method 700 for facilitating a video editing using a user device, in accordance with some embodiments. Accordingly, at 702, the method 700 may include a step of setting up a user device and application. Further, at 704, the method 700 may include a step of acquiring the required information from the user device. Further, at 706, the method 700 may include a step of running the application in the background. Further, at 708, the method 700 may include a step of sensing the orientation of the user device. Further, at 710, the method 700 may include a step of operating the application according to the orientation of the user device. Further, at 712, the method 700 may include a step of generating a video. Further, at 714, the method 700 may include a step of editing a video in the user device.

Figure 8:
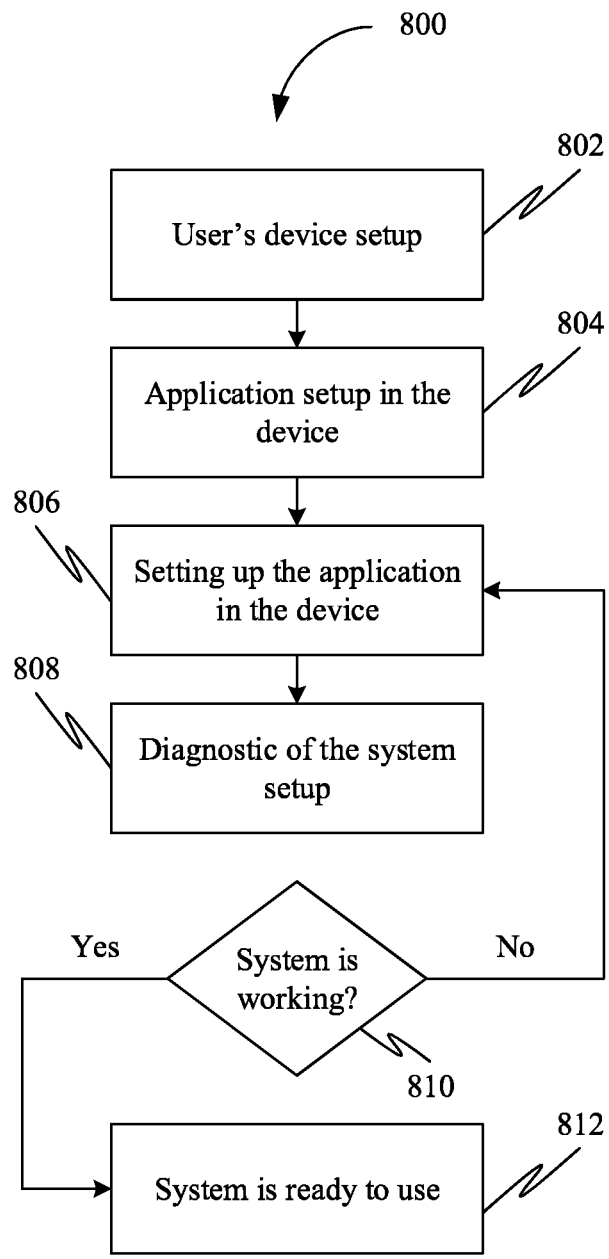
FIG. 8 is a flowchart of a method for setting up a user device, in accordance with some embodiments.

FIG. 8 is a flowchart of a method 800 for setting up a user device, in accordance with some embodiments. Accordingly, at 802, the method 800 may include a step of setting up a user device. Further, at 804, the method 800 may include a step of setting up application setup in the user device. Further, at 806, the method 800 may include a step of setting up the application in the user device. Further, at 808, the method 800 may include a step of diagnosing system setup. Further, at 810, the method 800 may include a step of determining whether the system is working or not. Further, if the system is working the method 800 may include a step 812 of getting the system ready for use. Further, if the system is not working, the method 800 may include a step 806 of setting up the application in the user device.

Figure 9:
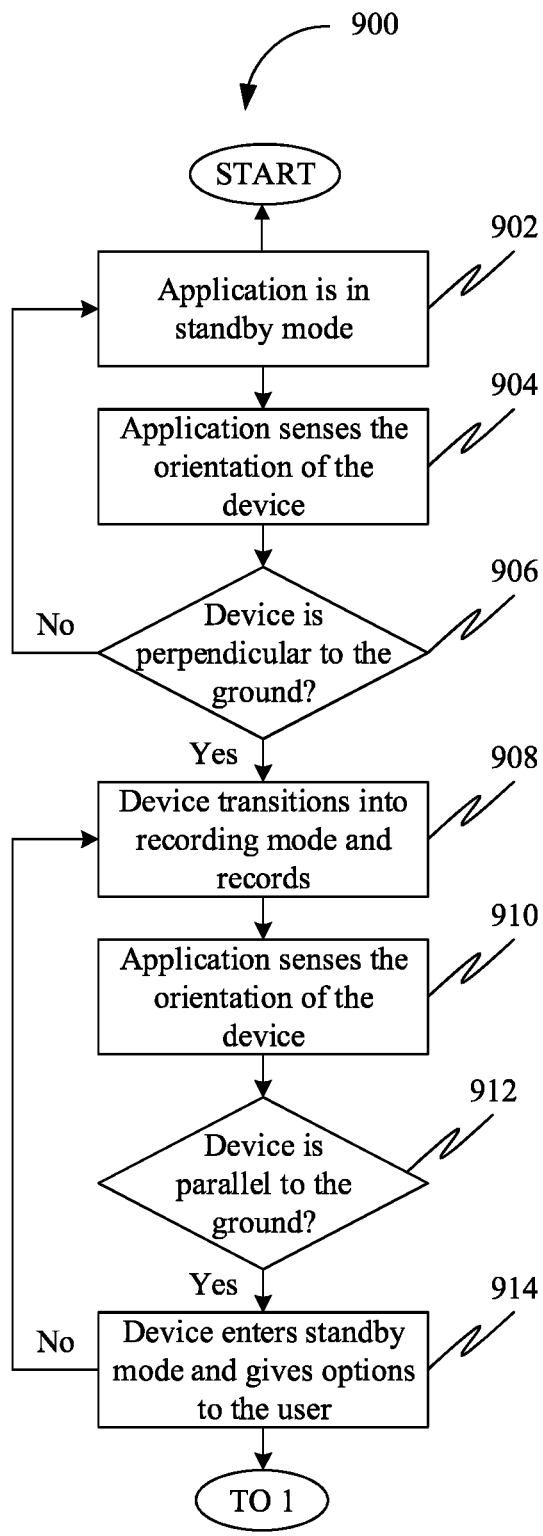
FIG. 9 is a flowchart of a method for facilitating a video recording on a user device, in accordance with some embodiments.

FIG. 9 is a flowchart of a method 900 for facilitating a video recording on a user device, in accordance with some embodiments. Accordingly, at 902, the method 900 may include a step of entering of application in standby mode. Further, at 904, the method 900 may include a step of sensing the orientation of the user device. Further, at 906, the method 900 may include a step of determining whether the user device is perpendicular to the ground. Further, if the user device is not perpendicular to the ground the method 900 may include a step 902 of entering of the application in standby mode. Further, if the user device is perpendicular to the ground the method 900 may include a step 908 of transitioning of the user device into recording mode and record. Further, at 910, the method 900 may include a step of sensing the orientation of the user device. Further, at 912, the method 900 may include a step of determining whether the user device is parallel to the ground. Further, if the user device is not parallel to the ground the method 900 may include a step 908 of transitioning of the user device into recording mode and record. Further, if the user device is parallel to the ground the method 900 may include a step 914 of entering the user device into standby mode and giving options to a user.

Figure 10:
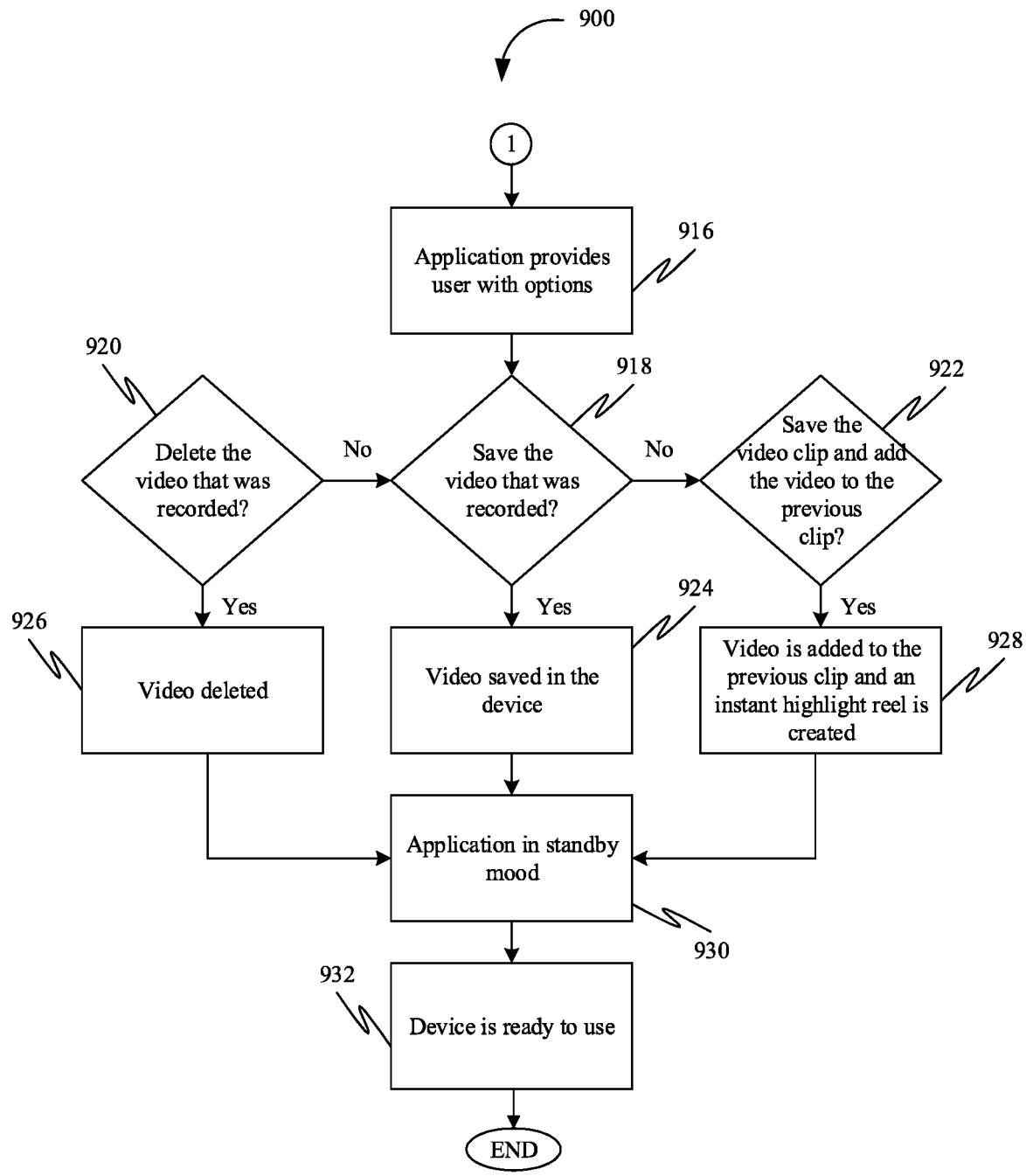
FIG. 10 is a continuation flowchart of a method used for explaining processes carried out by the user device shown in FIG. 9.

FIG. 10 is a continuation flowchart of the method 900 used for explaining processes carried out by the user device shown in FIG. 9. Accordingly, at 916, the method 900 may include a step of providing the user with options. Further, at 918, the method 900 may include a step of determining whether to save the video that was recorded. Further, at 920, the method 900 may include a step of determining whether to delete the video that was recorded. Further, if the video is deleted the method 900 may include a step 926 of deleting the video. Further, at 930, the method 900 may include a step of entering of application in standby mode. Further, if the video is not deleted the method 900 may include a step 918 of determining whether to save the video that was recorded. Further, if the video is saved the method 900 may include a step 924 of saving the video in the user device. Further, at 930, the method 900 may include a step of entering of the application in standby mode. Further, if the video is not saved the method 900 may include a step 922 of determining whether to save the video clip and add the video to the previous clip. Further, if the video clip is saved and added the video to the previous device the method 900 may include a step 928 of adding the video to the previous clip and creating an instant highlight reel. Further, at 930, the method 900 may include a step of entering of the application in standby mode. Further, at 932, the method 900 may include a step of the user device ready for use.

Figure 11:
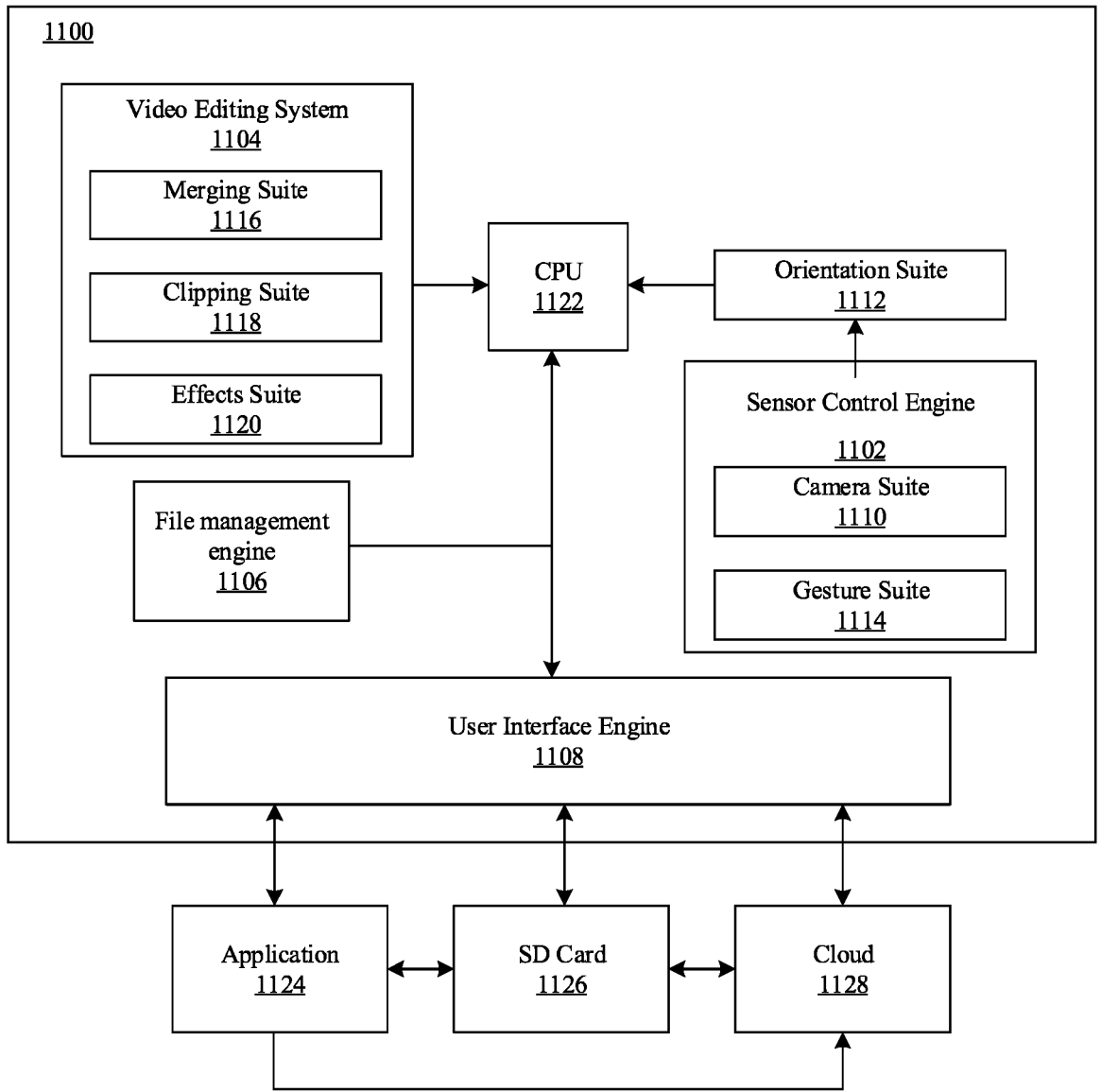
FIG. 11 is a block diagram of a user device, in accordance with some embodiments.

FIG. 11 is a block diagram of a user device 1100, in accordance with some embodiments. Accordingly, the user device 1100 may include a sensor control engine 1102, a video editing system 1104, a file management engine 1106, a user interface (UI) engine 1108, and a CPU 1122. Further, the sensor control engine 1102 uses the data captured by the sensors of a smart device to control video recording operations. Further, the sensor control engine 1102 may include a camera suite 1110, an orientation suite 1112, and a gesture suite 1114. Further providing a sensor control engine 1102 which not only interprets positional data, but also captures image data and transfers it to the video engine. Further, the term suite may be used herein to describe the more specified routines contained within a larger software engine. Further, the camera suite 1110 is a software interface between the user device 1100 microphones and the optical sensors of a smart device. Further, the camera suite 1110 may be responsible for turning the camera on or off and routing video data to the video editing system 1104 and the UI engine 1108.

Further, the orientation suite 1112 may be tasked with interpreting the data provided by the positional sensors of the smart device. Further, providing an orientation suite 1112 which generates control signals in response to the orientation of the smart device. Further, the horizontal standby mode may be initiated by a control signal generated when the orientation suite 1112 determines the smart device is in a horizontal orientation. Similarly, the perpendicular record mode may be initiated by a control signal generated when the orientation suite 1112 determines the smart device is in a perpendicular orientation.

Further, the gesture suite 1114 augments the function of the orientation suite 1112 by interpreting specific gestures made by a user holding a smart device running the user device 1100. Further, providing a gesture suite 1114 which generates varied commands in response to specific movements of a smart device. Further, in some embodiment of the present disclosure, the user may be able to automatically discard the most recently recorded video by shaking the smart device.

Further, the video editing system 1104 enables a user to modify the video data captured by the camera suite 1110. Further, the video editing system 1104 comprises a merging suite 1116, a clipping suite 1118, and an effects suite 1120. Further, providing a video editing suite which may be used to modify real-time video data generated by the camera suite 1110 as well as any video data stored by the file management system. Further, the merging suite 1116 enables a user to combine multiple video clips into a single long video.

Further, the clipping suite 1118 automatically removes short amounts of video from the start and end of each recorded video clip. Further, the clipping suite 1118 removes any extra video recordings which may occur while the smart device is being transitioned between the stand by and recording positions. Further, in some embodiment of the present disclosure, the effects suite 1120 enables a user to further modify any recorded video. Further, the effects suite 1120 may be used to modify properties such as frame rate, color saturation, audio settings, video quality, and the like.

Further, the file management engine 1106 may be tasked with storing and sorting recorded videos. Further, providing a file management engine 1106 which enables a user to search for, delete, rename, and create video files. Further, the file management engine 1106 works in conjunction with the UI engine 1108 to prompt the user to discard previously recorded videos and delete them from the device. Further, allowing the user to record subsequent videos quickly.

Further, the UI engine 1108 may be used to generate interactive images and menus, as well as interpret user input and issue commands in response to these inputs. Further, providing a UI engine 1108 which displays an image on the smart device's screen that indicates the program may be in standby mode whenever the phone is in a horizontal orientation. Further, the UI engine 1108 may be coupled with application 1124, a SD card 1126, and a cloud 1128. Additionally, the UI engine 1108 displays the video being recorded only while the smart device is in a perpendicular position. Further, if a video is not being recorded, then an image indicating how to record may be displayed. This functionality makes it easy for a user to determine the mode of operation through visual inspection of the smart device's screen and avoids undesired video recording.

Figure 12:
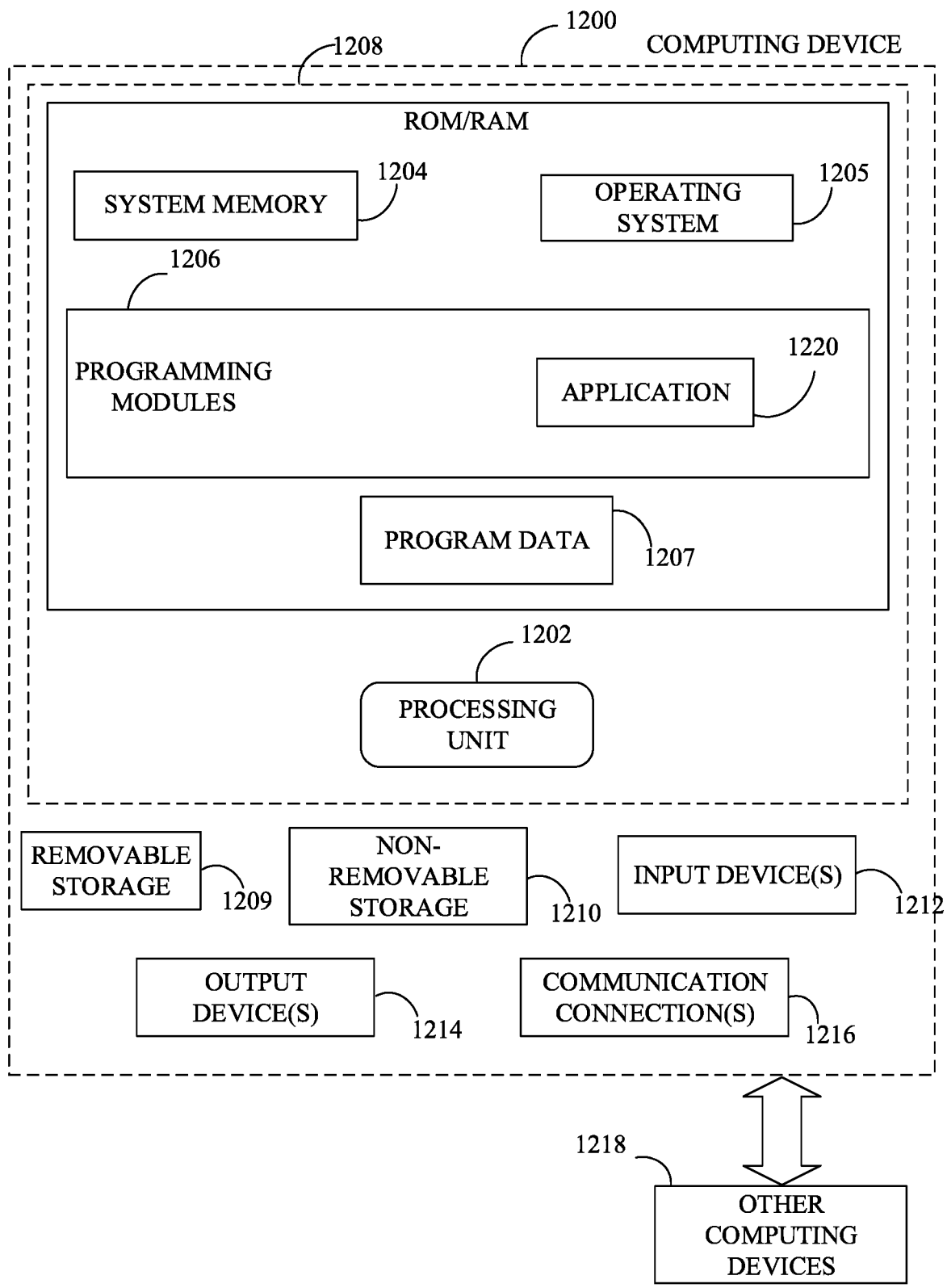
FIG. 12 is a block diagram of a computing device for implementing the methods disclosed herein, in accordance with some embodiments.

With reference to FIG. 12, a system consistent with an embodiment of the disclosure may include a computing device or cloud service, such as computing device 1200. In a basic configuration, computing device 1200 may include at least one processing unit 1202 and a system memory 1204. Depending on the configuration and type of computing device, system memory 1204 may comprise, but is not limited to, volatile (e.g. random-access memory (RAM)), non-volatile (e.g. read-only memory (ROM)), flash memory, or any combination.

System memory 1204 may include operating system 1205, one or more programming modules 1206, and may include a program data 1207. Operating system 1205, for example, may be suitable for controlling computing device 1200's operation. Furthermore, embodiments of the disclosure may be practiced in conjunction with a graphics library, other operating systems, or any other application program and is not limited to any particular application or system. This basic configuration is illustrated in FIG. 12 by those components within a dashed line 1208.

Computing device 1200 may have additional features or functionality. For example, computing device 1200 may also include additional data storage devices (removable and/or non-removable) such as, for example, magnetic disks, optical disks, or tape. Such additional storage is illustrated in FIG. 12 by a removable storage 1209 and a non-removable storage 1210. Computer storage media may include volatile and non-volatile, removable and non-removable media implemented in any method or technology for storage of information, such as computer-readable instructions, data structures, program modules, or other data. System memory 1204, removable storage 1209, and non-removable storage 1210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1200. Any such computer storage media may be part of device 1200. Computing device 1200 may also have input device(s) 1212 such as a keyboard, a mouse, a pen, a sound input device, a touch input device, a location sensor, a camera, a biometric sensor, etc. Output device(s) 1214 such as a display, speakers, a printer, etc. may also be included. The aforementioned devices are examples and others may be used.

Computing device 1200 may also contain a communication connection 1216 that may allow device 1200 to communicate with other computing devices 1218, such as over a network in a distributed computing environment, for example, an intranet or the Internet. Communication connection 1216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1204, including operating system 1205. While executing on processing unit 1202, programming modules 1206 (e.g., application 1220 such as a media player) may perform processes including, for example, one or more stages of methods, algorithms, systems, applications, servers, databases as described above. The aforementioned process is an example, and processing unit 1202 may perform other processes.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A user device comprising:
   at least one sensor configured for generating at least one sensor data associated with the user device, wherein the at least one sensor data corresponds to at least one physical state of the user device;
   at least one camera configured to generate at least one image;
   a processing device communicatively coupled with the at least one sensor and the at least one camera, wherein the processing device is configured for:
   analyzing the at least one sensor data;
   determining a mode based on the analyzing, wherein the mode comprises at least one of a recording mode and a standby mode;
   activating the at least one camera based on the mode;
   presenting a plurality of options based on the mode being the standby mode;
   processing the at least one image based on an option of the plurality of options;
   a presentation device communicatively coupled with the processing device, wherein the presentation device is configured for presenting the plurality of options;
   wherein when the device is horizontal to the surface of the earth, the device enters into the standby mode,
   wherein when the device is in a perpendicular orientation to the surface of the earth, the device automatically enters into the recording mode; and
   an input device communicatively coupled with the processing device, wherein the input device is configured for receiving at least one input data from a user associated with the user device, wherein the at least one input data corresponds to the option of the plurality of options.

2. The user device of claim 1 further comprising a microphone communicatively coupled with the processing device, wherein the microphone is configured for generating at least one sound data, wherein the processing device is configured for activating the microphone based on the mode.

3. The user device of claim 1, wherein the input device is configured to generate the at least one input data based on at least one signal provided by the user, wherein the at least one signal corresponds to the option.

4. The user device of claim 1, wherein the input device is configured to generate the at least one input data based on the physical state of the user device, wherein the at least one physical state of the user device corresponds to the option.

5. The user device of claim 1, wherein the at least one sensor data corresponds to at least one signal provided by the user, wherein the determining of the mode is based on the analyzing of the at least one sensor data.

6. The user device of claim 1, wherein the presentation device is configured for presenting the at least one image.

7. The user device of claim 1, wherein the at least one sensor data corresponds to an environment of the user device, wherein the determining of the mode is based on the analyzing of the at least one sensor data.

8. The user device of claim 1, wherein the presentation device is configured for receiving an option indication from the user associated with the user device, wherein the option indication corresponds to the option.

9. The user device of claim 1, wherein the processing device is further configured for:
   presenting a plurality of recording option based on the mode being the recording mode;
   processing the at least one image based on a recording option of the plurality of recording options, wherein the presenting device is configured for presenting the plurality of recording options, wherein the input device is configured to receive the at least one input data corresponding to the recording option of the plurality of recording options.

10. A user device comprising:
    at least one sensor configured for generating at least one sensor data associated with the user device, wherein the at least one sensor data corresponds to at least one physical state of the user device;

at least one camera configured to generate at least one image;

a microphone configured to generate at least one sound data;

a processing device communicatively coupled with the at least one sensor, the microphone and the at least one camera, wherein the processing device is configured for:

analyzing the at least one sensor data;

determining a mode based on the analyzing, wherein the mode comprises at least one of a recording mode and a standby mode;

activating the at least one camera and the microphone based on the mode;

presenting a plurality of options based on the mode being the standby mode;

processing the at least one image based on an option of the plurality of options;

a presentation device communicatively coupled with the processing device, wherein the presentation device is configured for presenting the plurality of options;

wherein when the device is horizontal to the surface of the earth, the device enters into the standby mode, wherein when the device is in a perpendicular orientation to the surface of the earth, the device automatically enters into the recording mode; and an input device communicatively coupled with the processing device, wherein the input device is configured for receiving at least one input data from a user associated with the user device, wherein the at least one input data corresponds to the option of the plurality of options.

11. The user device of claim 10, wherein the input device is configured to generate the at least one input data based on at least one signal provided by the user, wherein the at least one signal corresponds to the option.

12. The user device of claim 10, wherein the input device is configured to generate the at least one input data based on the physical state of the user device, wherein the at least one physical state of the user device corresponds to the option.

13. The user device of claim 10, wherein the at least one sensor data corresponds to at least one signal provided by the user, wherein the determining of the mode is based on the analyzing of the at least one sensor data.

14. The user device of claim 10, wherein the presentation device is configured for presenting the at least one image.

15. The user device of claim 10, wherein the at least one sensor data corresponds to an environment of the user device, wherein the determining of the mode is based on the analyzing of the at least one sensor data.

16. The user device of claim 10, wherein the processing device is further configured for:

presenting a plurality of recording option based on the mode being the recording mode;

processing the at least one image based on a recording option of the plurality of recording options, wherein the presentation device is configured for presenting the plurality of recording options, wherein the input device is configured to receive the at least one input data corresponding to the recording option of the plurality of recording options.

17. The user device of claim 10, wherein the presentation device is configured for receiving an option indication from the user associated with the user device, wherein the option indication corresponds to the option.

18. A user device comprising:

at least one sensor configured for generating at least one sensor data associated with the user device, wherein the at least one sensor data corresponds to at least one of an orientation and a motion of the user device;

at least one camera configured to generate at least one image;

a microphone configured to generate at least one sound data;

a processing device communicatively coupled with the at least one sensor, the microphone and the at least one camera, wherein the processing device is configured for:

analyzing the at least one sensor data;

determining a mode based on the analyzing, wherein the mode comprises at least one of a recording mode and a standby mode;

activating the at least one camera and the microphone based on the mode;

presenting a plurality of options based on the mode being the standby mode;

processing the at least one image based on an option of the plurality of options;

a presentation device communicatively coupled with the processing device, wherein the presentation device is configured for presenting the plurality of options;

wherein when the device is horizontal to the surface of the earth, the device enters into the standby mode, wherein when the device is in a perpendicular orientation to the surface of the earth, the device automatically enters into the recording mode; and an input device communicatively coupled with the processing device, wherein the input device is configured for receiving at least one input data from a user associated with the user device, wherein the at least one input data corresponds to the option of the plurality of options.

19. The user device of claim 18, wherein the input device is configured to generate the at least one input data based on the at least one of the orientation and the motion of the user device, wherein the at least one of the orientation and the motion of the user device corresponds to the option.

20. The user device of claim 18, wherein the input device is configured to generate the at least one input data based on at least one signal provided by the user, wherein the at least one signal corresponds to the option.

* * * * *